United States Patent
Pajukoski et al.

(10) Patent No.: US 12,438,758 B2
(45) Date of Patent: Oct. 7, 2025

(54) SPECTRAL SHAPING WITH SPECTRUM EXTENSION FOR REFERENCE SIGNALS FOR WIRELESS NETWORKS

(71) Applicant: Nokia Technologies Oy, Espoo (FI)

(72) Inventors: Kari Pajukoski, Oulu (FI); Esa Tiirola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 392 days.

(21) Appl. No.: 17/926,212

(22) PCT Filed: May 22, 2020

(86) PCT No.: PCT/EP2020/064249
§ 371 (c)(1),
(2) Date: Nov. 18, 2022

(87) PCT Pub. No.: WO2021/233550
PCT Pub. Date: Nov. 25, 2021

(65) Prior Publication Data
US 2023/0188396 A1    Jun. 15, 2023

(51) Int. Cl.
*H04L 27/26*    (2006.01)
*H04L 5/00*    (2006.01)

(52) U.S. Cl.
CPC ........ *H04L 27/2613* (2013.01); *H04L 5/0051* (2013.01); *H04L 27/2614* (2013.01)

(58) Field of Classification Search
CPC ............... H04L 27/2613; H04L 5/0051; H04L 27/2614
See application file for complete search history.

(56) References Cited

U.S. PATENT DOCUMENTS

| | | | |
|---|---|---|---|
| 9,264,961 B1 * | 2/2016 | Shah | H04W 36/00835 |
| 2017/0332364 A1 * | 11/2017 | Sano | H04J 11/0036 |
| 2020/0076670 A1 | 3/2020 | Liu et al. | |
| 2020/0322201 A1 * | 10/2020 | Kuchi | H04L 27/2636 |

FOREIGN PATENT DOCUMENTS

WO    2010/004586 A2    1/2010

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 16)", 3GPP TS 36.101, V16.5.0, Mar. 2020, 2030 pages.

(Continued)

*Primary Examiner* — Marcus Smith
*Assistant Examiner* — Zhaohui Yang
(74) *Attorney, Agent, or Firm* — Barta Jones, PLLC

(57) ABSTRACT

A method may include receiving, by a user device from a network node, information indicating a set of frequency resources assigned to the user device for uplink transmission and a spectrum shaping configuration indicating at least spectrum shaping with spectrum extension for transmission of reference signals via the set of frequency resources; performing, by the user device, spectrum shaping with spectrum extension for a reference signal; and transmitting the spectrum shaped and extended reference signal via at least a portion of the set of frequency resources.

6 Claims, 9 Drawing Sheets

(56) References Cited

OTHER PUBLICATIONS

"3rd Generation Partnership Project; Technical Specification Group Radio Access Network; NR; User Equipment (UE) radio transmission and reception; Part 1: Range 1 Standalone (Release 16)", 3GPP TS 38.101-1, V16.3.0, Mar. 2020, pp. 1-332.

"3rd Generation Partnership Project; Technical Specification Group Radio Access Network; NR; User Equipment (UE) radio transmission and reception; Part 2: Range 2 Standalone (Release 16)", 3GPP TS 38.101-2, V16.3.1, Mar. 2021, pp. 1-170.

"On spectrum shaping for uplink Pi/2 BPSK with DFT-S-OFDM", 3GPP TSG-RAN WG1#89, R1-1709002, Agenda item: 7.1.5, Nokia, May 15-19, 2017, 3 pages.

"Further Link Results for p/2 BPSK DFT-S-OFDM Waveform with Spectrum Shaping and MMSE Receiver", 3GPP TSG RAN WG4 Meeting #85, R4-1714191, Agenda Item: 9.4.3.2, IITH, Nov. 27-Dec. 1, 2017, 5 pages.

"Performance evaluation for pi/2 BPSK with FDSS", 3GPP TSG RAN WG1 Meeting #88bis, R1-1705060, Agenda Item: 8.1.10, Huawei, Apr. 3-7, 2017, 8 pages.

"On the detection performance of pi/2-BPSK DFT-s-OFDM with transparent shaping", 3GPP TSG-RAN WG4 Meeting #84bis, R4-1710213, Agenda Item: 9.4.3.10, Huawei, Oct. 9-13, 2017, 4 pages.

"DFT-Spread OFDM with Pulse Shaping Filter in Frequency Domain in Evolved UTRA Uplink", 3GPP TSG RAN WG1 #42 on LTE, R1-050702, Agenda Item: 10.3, NTT DoComo, Aug. 29-Sep. 2, 2005, pp. 1-8, Mar. 14, 2025.

"RF signal aspects to frequency and time domain implementations of SC-FDMA", 3GPP TSG-RAN WG1 Meeting #42, R1-050817, Agenda Item: 10.1, Nokia, Aug. 29-Sep. 2, 2005, 3 pages.

"On spectrum shaping for uplink Pi/2 BPSK with DFT-S-OFDM", 3GPP TSG RAN WG1 NR Ad-Hoc#2, R1-1711398, Agenda item: 5.1.5, Nokia, Jun. 27-30, 2017, 4 pages.

"DVB-S2", Wikipedia, Retrieved on Apr. 30, 2024, Webpage available at : https://en.wikipedia.org/wiki/DVB-S2, 5 pages.

"White Paper on the use of DVB-S2X for DTH applications, DSNG & Professional Services, Broadband Interactive Services and VL-SNR applications", Digital Video Broadcasting, DVB Document A172, Mar. 2015, 16 pages.

"Digital Video Broadcasting (DVB); Implementation guidelines for the second generation system for Broadcasting, Interactive Services, News Gathering and other broadband satellite applications; Part 1: DVB-S2", ETSI TR 102 376-1, V1.2.1, Nov. 2015, pp. 1-118.

"3rd Generation Partnership Project; Technical Specification Group Radio Access Network; NR; Physical channels and modulation (Release 16)", 3GPP TS 38.211, V16.1.0, Mar. 2020, pp. 1-130.

Office Action received for corresponding European Patent Application No. 20727990.2, dated Mar. 5, 2024, 3 pages.

Samsung, "Frequency domain spectrum shaping for DFT-s-OFDM," 3GPP TSG RAN WGI Meeting #88bis, R1-1705332, Spokane, USA, Apr. 3-7, 2017.

* cited by examiner

Transmitter with frequency domain spectrum shaping (FDSS 414), without spectrum extension Transmitter with frequency domain spectrum shaping (FDSS) via time domain precoder 512 (implemented as cyclic shifter), without spectrum extension Transmitter with frequency domain spectrum spreading (FDSS 414) with spectrum extension (spectrum spreading provided via cyclic extension 610)

SPECTRAL SHAPING WITH SPECTRUM EXTENSION FOR REFERENCE SIGNALS FOR WIRELESS NETWORKS

CROSS REFERENCE TO RELATED APPLICATION

This patent application is a U.S. National Stage application of International Patent Application Number PCT/EP2020/064249 filed May 22, 2020, which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, by a user device from a network node, information indicating a set of frequency resources assigned to the user device for uplink transmission and a spectrum shaping configuration indicating at least spectrum shaping with spectrum extension for transmission of reference signals via the set of frequency resources; performing, by the user device, spectrum shaping with spectrum extension for a reference signal; and transmitting the spectrum shaped and extended reference signal via at least a portion of the set of frequency resources.

According to an example embodiment, a method may include transmitting, by a network node to a user device, information indicating a set of frequency resources assigned to the user device for uplink transmission and a spectrum shaping configuration indicating at least spectrum shaping with spectrum extension for transmission of reference signals via the set of frequency resources; and receiving, by the network node from the user device based on the sending, a spectrum shaped and extended reference signal via at least a portion of the set of frequency resources assigned to the user device.

Other example embodiments are provided or described for various described example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
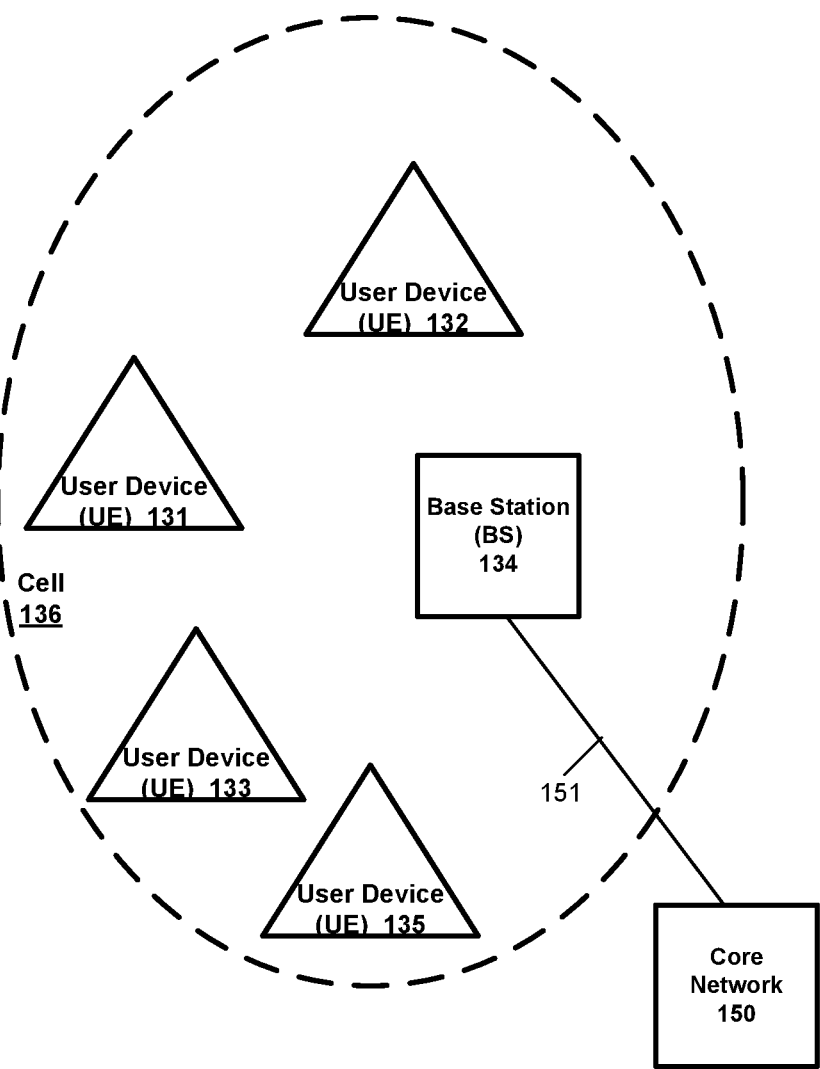
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as 5G (New Radio (NR)), LTE, LTE-A, cmWave, and/or mmWave band networks, IoT, MTC, eMTC, eMBB, URLLC, NR sidelink communications, etc., or any other wireless network or wireless technology. These example networks, technologies or data service types are provided only as illustrative examples.

A peak-to-average power (PAPR) ratio may, for example, refer to a ratio between a maximum instantaneous power and the average power of a signal, such as for an Orthogonal Frequency Division Multiplexing (OFDM) signal. Low PAPR transmissions may significantly increase a cell coverage or cell range, as a low PAPR transmission may allow for a high (or higher) power transmission without saturating the power amplifier at the transmitter.

A Pi/2-Binary Phase Shift Keying (Pi/2-PBSK) modulation scheme has been introduced for New Radio (NR/5G) to support low PAPR uplink data transmissions using a Discrete Fourier Transform-spread-Orthogonal Frequency Division Multiplexing (DFT-spread-OFDM) waveform (data). Reference signals, such as demodulation reference signals (DMRS), may be transmitted via time division multiplexing with the data over uplink resources. DMRS signals may be used to facilitate coherent detection of uplink data channel(s) or uplink control channel(s). They may be used, e.g., for channel estimation, timing estimation, uplink sounding, facilitating UL MIMO. For NR uplink (UL) communications, 3GPP NR decided to apply FDSS (Frequency Domain Spectral Shaping) for pi/2 BPSK modulation without spectrum extension for data. The exact FDSS function is not defined in the standard, but the performance requirements are specified to define the boundary conditions to the UE implementation. Thus, the standard allows for vendors to provide their own implementation and performance optimizations, and the system performance is required to meet a minimum performance requirements related to spectrum flatness, in-band/out-of-band emission and EVM. Further, NR standard assumes the same FDSS for both data and DMRS in order to allow joint equalization of the channel response and FDSS in the BS receiver side. This arrangement introduces two problems. First problem is receiver loss with maximum allowed FDSS by considering UE requirement. This is because of the noise enhancement of the joint equalizer due to FDSS attenuation in the allocation edges. Second problem is due to usage of the same FDSS for data and DMRS. The optimal FDSS for data may negatively impact on characteristics of DMRS, such as accuracy of channel estimation and cross-correlation between different pilot sequences.

Therefore, according to example embodiments, spectrum shaping with spectrum extension may be performed by a UE for reference signals. The UE may receive configuration information from a network node (e.g., BS or gNB), e.g., including a spectrum shaping configuration that may indicate at least spectrum shaping with spectrum extension for the reference signals. The UE may then transmit the spectrum shaped and extended reference signals (e.g., DMRS signals, or sounding reference signals (SRS), or other reference signals). According to example embodiments, spectrum shaping may be separately optimized for data and DMRS, and spectral shaping with spectrum extension may be performed by a UE for reference signals.

Spectrum shaping, e.g., which may include frequency domain spectrum shaping (FDSS), is a PAPR reduction technique that can be performed in either time domain (e.g., before a Discrete Fourier Transform step at the transmitter) or in frequency domain (e.g., after a Discrete Fourier Transform). Spectrum shaping may include the use of a filter to adjust the amplitude of one or more subcarriers or spectral components of a signal, e.g., in order to reduce PAPR for a transmitted signal or increase the maximum transmit power in certain scenario or obtain other desired benefit. Some spectral shaping filters may provide a rounding function in which subcarriers or spectral components, e.g., near an edge of a channel or portion of bandwidth may be decreased or rounded-off, in order to reduce PAPR of the transmitted signal. Some example filters that may be used to provide spectrum shaping may include, e.g., a time domain precoding or time domain filter, including at least one of a (1+D) or a (x 1 x) filter or a time domain filter with more than three taps; a frequency domain filter; a raised cosine (RC) filter; a root raised cosine (RRC) filter; and/or a truncated filter, as some examples. Other spectrum shaping functions or filters may be used. Spectrum shaping may be performed either without spectrum extension, or with a spectrum extension.

A spectrum extension may also be performed to further reduce PAPR of a signal. Spectrum extension may extend or increase the spectrum or range of frequencies of a signal, and thereby reduce PAPR of the signal. For example, a cyclic extension may be used to perform spectrum extension in the frequency domain for a signal. A cyclic extension may involve copying a portion of DFT outputs (or frequency domain values output by a DFT block) at the end of DFT outputs and appends those frequency domain values to the beginning of the DFT outputs, which results in adding additional frequency domain values or excess (or additional) frequency bands. This increases the spectrum or range of frequencies of the frequency domain values output by the DFT, thus causing a spectrum extension or increase in frequency range of the original signal. Other techniques may also be used to perform spectrum extension for a signal. In general, spectrum shaping may reduce PAPR of a signal, and spectrum extension may further reduce PAPR of the signal. Thus, the spectrum shaping and spectrum extension may both be used for a signal to provide even greater reduction of PAPR of the signal.

Figure 2:
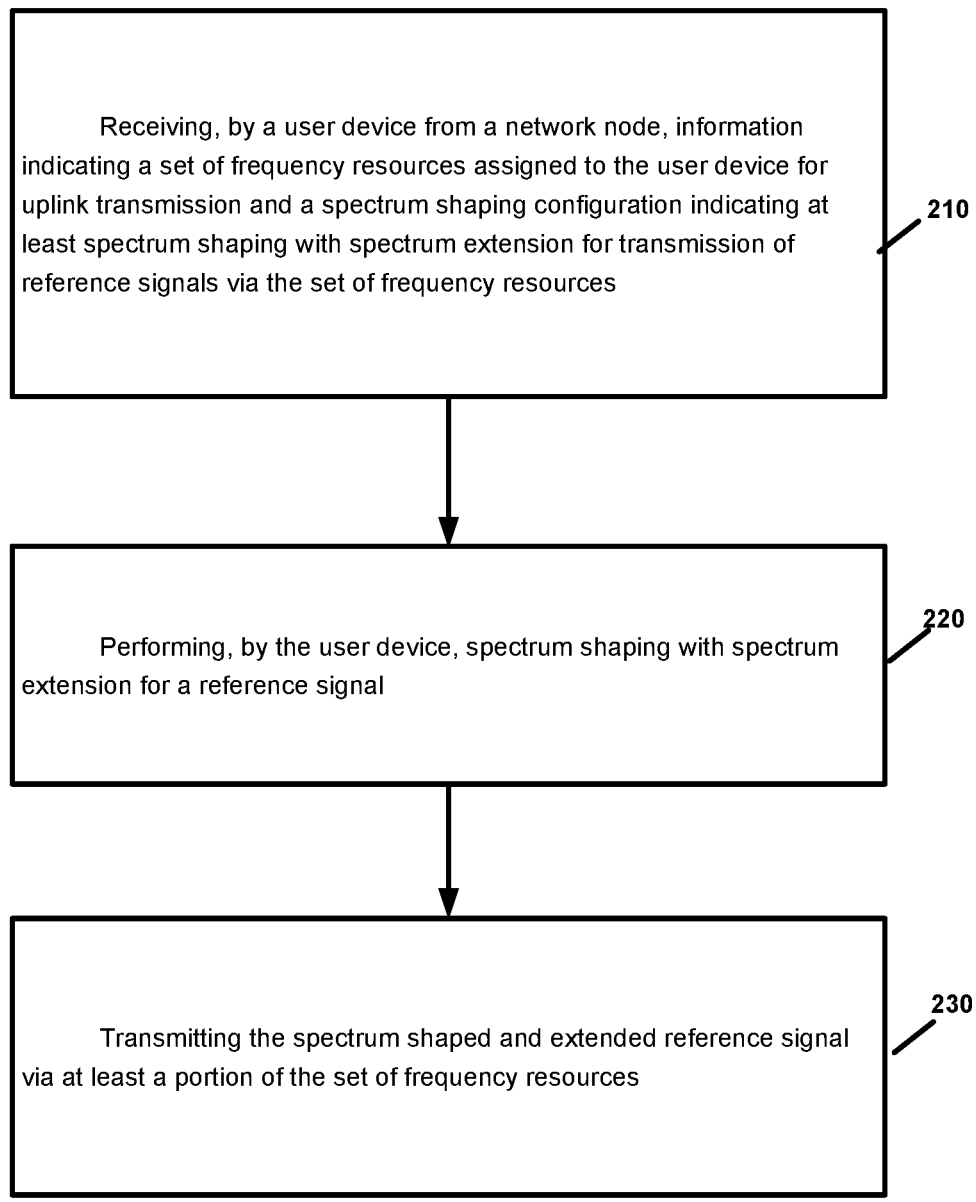
FIG. 2 is a flow chart illustrating operation of a user device (UE) according to an example embodiment.

FIG. 2 is a flow chart illustrating operation of a user device (UE) according to an example embodiment. Operation 210 includes receiving, by a user device (or UE) from a network node (e.g., BS, gNB, eNB), information indicating a set of frequency resources assigned to the user device for uplink transmission and a spectrum shaping configuration indicating at least spectrum shaping with spectrum extension for transmission of reference signals via the set of frequency resources. Operation 220 includes performing, by the user device, spectrum shaping with spectrum extension for a reference signal. And, operation 230 includes transmitting the spectrum shaped and extended reference signal via at least a portion of the set of frequency resources.

For the method of FIG. 2, the receiving information may include receiving, by the user device from the network node, information indicating at least the set of frequency resources for uplink transmission and the spectrum shaping configuration that indicates spectrum shaping without spectrum extension for data transmission and spectrum shaping with spectrum extension for reference signal transmission; the method further including: performing, by the user device, spectrum shaping without spectrum extension for a block of data; wherein the transmitting further comprises transmitting, by the user device, the spectrum shaped block of data via at least a portion of the set of frequency resources.

For the method of FIG. 2, the receiving information may include: receiving, by the user device from the network node, an uplink scheduling grant (e.g., a dynamic grant, or a configured grant/semi-persistent grant) indicating at least the set of frequency resources (e.g., UL grant may indicate one or more subcarriers, such as indicating a physical resource block (PRB), including a set of 12 (or other number of) subcarriers, allocated to the UE) for uplink transmission, and the spectrum shaping configuration that indicates spectrum shaping without spectrum extension for data transmission and spectrum shaping with spectrum extension for reference signal transmission. Thus, for example, the uplink (UL) grant (received by the UE/user device from a network node/gNB) may provide or indicate a spectrum shaping configuration associated with the UL grant, e.g., via downlink control information (DCI) and/or radio resource control (RRC) message(s). The spectrum shaping configuration may, for example, provide information related to spectrum shaping and/or spectrum extension for data and/or reference signal transmission. For example, the spectrum shaping configuration may indicate whether spectrum shaping and/or spectrum extension will be performed for data and/or for a reference signal (e.g., DMRS or SRS signals) transmitted via the indicated UL resources of the UL grant. For example, the spectrum shaping configuration may indicate spectrum shaping without spectrum extension for data, and spectrum shaping with spectrum extension for DMRS transmission via the UL frequency resources. The data and reference (e.g., DMRS or SRS) signals may be time-division-multiplexed over the indicated frequency resources of the UL grant. In some cases, the data may be transmitted via all (e.g., all 12) subcarriers of a PRB (physical resource block) allocated to the UE for UL transmission, while the reference signals (e.g., DMRS or SRS) may be transmitted via a subset of the subcarriers of the PRB allocated to the UE. Because of the spectrum extension for the reference signals (e.g., DMRS signal), a portion of the DMRS signal may also be transmitted via one or more subcarriers that are excess band (or outside of the PRB allocated to the user device/UE, and are within an adjacent PRB that is allocated to another UE), for example. For example, the spectrum shaping configuration may indicate one or more parameters associated with spectrum shaping and/or spectrum extension, e.g., such as an indication of a type of filter or processing to be used to perform spectrum shaping and/or spectrum extension, information indicating or describing an IFDM comb (e.g., indicating which in-band subcarriers of a physical resource block allocated to the UE, and which excess band subcarriers outside of the PRB allocated to the UE) that may be used by the UE for reference signal (e.g., DMRS) transmission, or other parameter or configuration related to spectrum shaping and/or spectrum extension. In certain embodiments, some of the parameters (if not all) related to spectrum extension of reference signal may be fixed or hard-coded by the specification. For example, the type of filter or roll-off or the size of excess bandwidth may be given by the specification.

Also, for the method of FIG. 2, the performing spectrum shaping without spectrum extension for the block of data may be performed based on at least one of the following: a time domain precoding or time domain filter, including at least one of a (1+D) or a (x 1 x) filter; a frequency domain filter; a raised cosine (RC) filter; a root raised cosine (RRC) filter; a truncated filter; or a filter adapted according to a frequency location on a carrier or a location within a frequency band or a location within a bandwidth part of the set of frequency resources assigned to the user device for uplink transmission. Also, for example, the performing spectrum shaping with spectrum extension for the reference signal (e.g., DMRS or SRS signal) may be performed based on at least one of the following: a frequency domain filter; a filter having a predefined roll-off; a raised cosine (RC) filter; a root raised cosine (RRC) filter; a truncated filter; or a filter adapted according to a frequency location on a carrier or a location within a frequency band or a location within a bandwidth part of the set of frequency resources assigned to the user device for uplink transmission.

The method of FIG. 2 may include determining, based on the received spectrum shaping configuration, one or more parameters of a filter used by the user device to perform spectrum shaping.

For the method of FIG. 2, the reference signal comprises at least one of: demodulation reference signals (DMRS); or sounding reference signals (SRS).

For the method of FIG. 2, the performing spectrum shaping with spectrum extension may include performing at least: performing a spectrum extension for the reference signal to cause one or more frequency domain values associated with the reference signal to extend to one or more frequency resources that are beyond the set of frequency resources assigned to the user device.

For the method of FIG. 2, the transmitting the spectrum shaped and extended reference signal may include: transmitting the spectrum shaped and extended reference signal via a combination of both a subset of subcarriers within the set of frequency resources assigned to the user device, and one or more subcarriers that are beyond the set of frequency resources assigned to the user device.

For the method of FIG. 2, the user device may include a first user device, and wherein the set of frequency resources includes a first set of frequency resources assigned to the first user device, and wherein the transmitting the spectrum shaped and extended reference signal includes: transmitting, by the first user device, the spectrum shaped and extended reference signal via an interlaced frequency division multiplex (IFDM) comb using every nth subcarrier within the first set of frequency resources assigned to the first user device and one or more subcarriers of every nth subcarrier within a second set of frequency resources, wherein n is an integer greater than 1, wherein the second set of frequency resources is assigned to a second user device and is adjacent to the first set of frequency resources.

For the method of FIG. 2, the transmitting, by the user device, the spectrum shaped block of data via at least a portion of the set of frequency resources may include: transmitting the spectrum shaped data via only the set of frequency resources assigned to the user device, and not extending into or using frequency resources that are outside of or beyond the set of frequency resources assigned to the user device.

For the method of FIG. 2, the receiving may include receiving information indicating a set of time-frequency resources including a set of subcarriers of a physical resource block (PRB) assigned to the user device for uplink transmission for a plurality of symbols, wherein the user device uses time division multiplexing to transmit the data block and the reference signal via the set of subcarriers of the PRB assigned to the user device within at least a portion of the plurality of symbols.

For the method of FIG. 2, performing spectrum shaping with spectrum extension for a reference signal may include at least: performing, by the user device, a spectrum extension for the reference signal via a cyclic extension in frequency domain for the reference signal.

Figure 3:
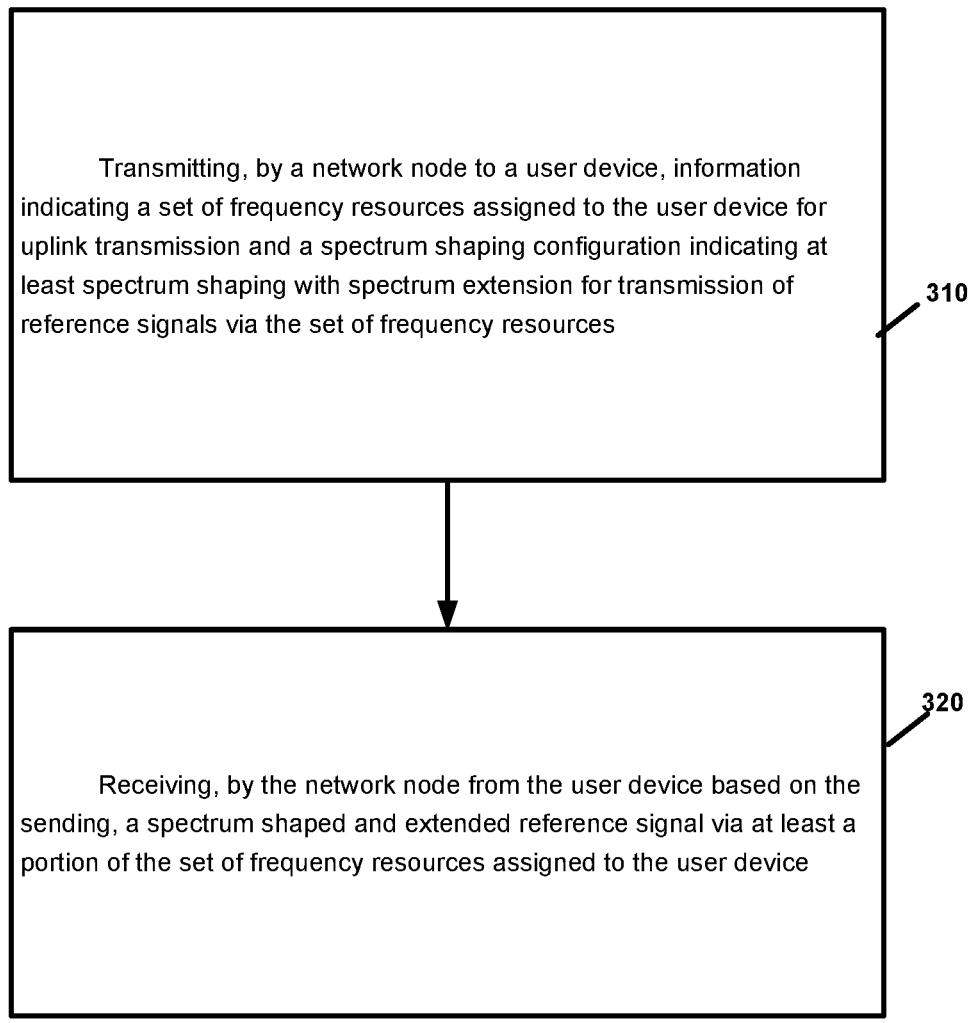
FIG. 3 is a flow chart illustrating operation of a network node (e.g., BS, gNB) according to an example embodiment.

FIG. 3 is a flow chart illustrating operation of a network node (e.g., BS, gNB) according to an example embodiment. Operation 310 includes transmitting, by a network node to a user device (UE), information indicating a set of frequency resources assigned to the user device for uplink transmission and a spectrum shaping configuration indicating at least spectrum shaping with spectrum extension for transmission of reference signals via the set of frequency resources. And, operation 320 includes receiving, by the network node from the user device based on the sending, a spectrum shaped and extended reference signal via at least a portion of the set of frequency resources assigned to the user device.

For the method of FIG. 3, the transmitting information may include sending, by the network node to the user device, information indicating at least the set of frequency resources for uplink transmission and the spectrum shaping configuration that indicates spectrum shaping without spectrum extension for data transmission and spectrum shaping with spectrum extension for reference signal transmission; wherein the receiving further includes receiving, by the network node from the user device, a spectrum shaped block of data via at least a portion of the set of frequency resources.

For the method of FIG. 3, the transmitting information may include: transmitting, by the network node to the user device, an uplink scheduling grant indicating at least the set of frequency resources for uplink transmission and the spectrum shaping configuration that indicates spectrum shaping without spectrum extension for data transmission and spectrum shaping with spectrum extension for reference signal transmission.

For the method of FIG. 3, the reference signal may include at least one of: demodulation reference signals (DMRS); or sounding reference signals (SRS).

For the method of FIG. 3, the receiving the spectrum shaped and extended reference signal may include: receiving the spectrum shaped and extended reference signal via a combination of both a subset of subcarriers within the set of frequency resources assigned to the user device, and one or more subcarriers that are beyond or outside of the set of frequency resources assigned to the user device.

For the method of FIG. 3, the user device includes a first user device, and wherein the set of frequency resources comprises a first set of frequency resources assigned to the first user device, and wherein the receiving the spectrum shaped and extended reference signal includes: receiving, by the network node from the first user device, the spectrum shaped and extended reference signal via an interlaced frequency division multiplex (IFDM) comb using every nth subcarrier within the first set of frequency resources assigned to the first user device and one or more subcarriers of every nth subcarrier within a second set of frequency resources, wherein n is an integer greater than 1, wherein the second set of frequency resources is assigned to a second user device and is adjacent to the first set of frequency resources.

For the method of FIG. 3, the receiving, by the network node, the spectrum shaped block of data via at least a portion of the set of frequency resources includes: receiving, by the network node from the user device, the spectrum shaped data via only the set of frequency resources assigned to the user device, and not extending into or using frequency resources that are outside of or beyond the set of frequency resources assigned to the user device.

For the method of FIG. 3, the user device may include a first user device, wherein the transmitting information includes: transmitting, by the network node to the first user device, information indicating a first set of frequency resources assigned to the first user device for uplink transmission and a spectrum shaping configuration indicating at least spectrum shaping with spectrum extension for transmission of reference signals via the first set of frequency resources; the method further including: transmitting, by the network node to a second user device, information indicating a second set of frequency resources assigned to the second user device for uplink transmission and a spectrum shaping configuration indicating at least spectrum shaping with spectrum extension for transmission of reference signals via the second set of frequency resources; and wherein the first set of frequency resources is orthogonal to the second set of frequency resources, such that a spectrum shaped and extended reference signal transmission from the first user device remains orthogonal or does not interfere with a spectrum shaped and extended reference signal transmission from the second user device.

For the method of FIG. 3, the user device comprises a first user device, wherein the transmitting information includes: transmitting, by the network node to the first user device, information indicating a first interlaced frequency division multiplex (IFDM) comb of subcarriers, including a subset of in-band subcarriers within a first physical resource block (PRB) allocated to the first user device and a subset of out-of-band subcarriers outside of the first PRB allocated to the first user device; the method further including: transmitting, by the network node to a second user device, information indicating a second interlaced frequency division multiplex (IFDM) comb of subcarriers, including a subset of in-band subcarriers within a second physical resource block (PRB) allocated to the second user device and a subset of out-of-band subcarriers outside of the second PRB allocated to the second user device; wherein the first PRB allocated to the first user device is adjacent to the second PRB allocated to the second user device; and, wherein the first IFDM comb of subcarriers is orthogonal to the second IFDM comb of subcarriers to allow the first user device and the second user device to transmit spectrum extended reference signals via the first IFDM comb of subcarriers and the second IFDM comb of subcarriers, respectively.

For the method of FIG. 3, the user device includes a first user device, wherein the transmitting information includes: transmitting, by the network node to the first user device, information indicating a first interlaced frequency division multiplex (IFDM) comb of subcarriers, including a subset of in-band subcarriers within a first physical resource block (PRB) allocated to the first user device and a subset of out-of-band subcarriers outside of the first PRB allocated to the first user device; the method further includes: transmitting, by the network node to a second user device, information indicating a second interlaced frequency division multiplex (IFDM) comb of subcarriers, including a subset of in-band subcarriers within a second physical resource block (PRB) allocated to the second user device and a subset of out-of-band subcarriers outside of the second PRB allocated to the second user device; wherein the receiving includes: receiving, by the network node from the first user device via at least the first IDFM comb of subcarriers, a spectrum shaped and extended reference signal, while suppressing reference signal interference caused by the spectrum extension of a reference signal transmitted by the second user device resulting from the spectrum extension present on a subset of the out-of-band subcarriers outside of the second PRB that overlaps the first PRB allocated to the first user device.

One or more of FIGS. 4-9 may be provided or used with respect to one or more of the methods of FIGS. 2-3.

Figure 4:
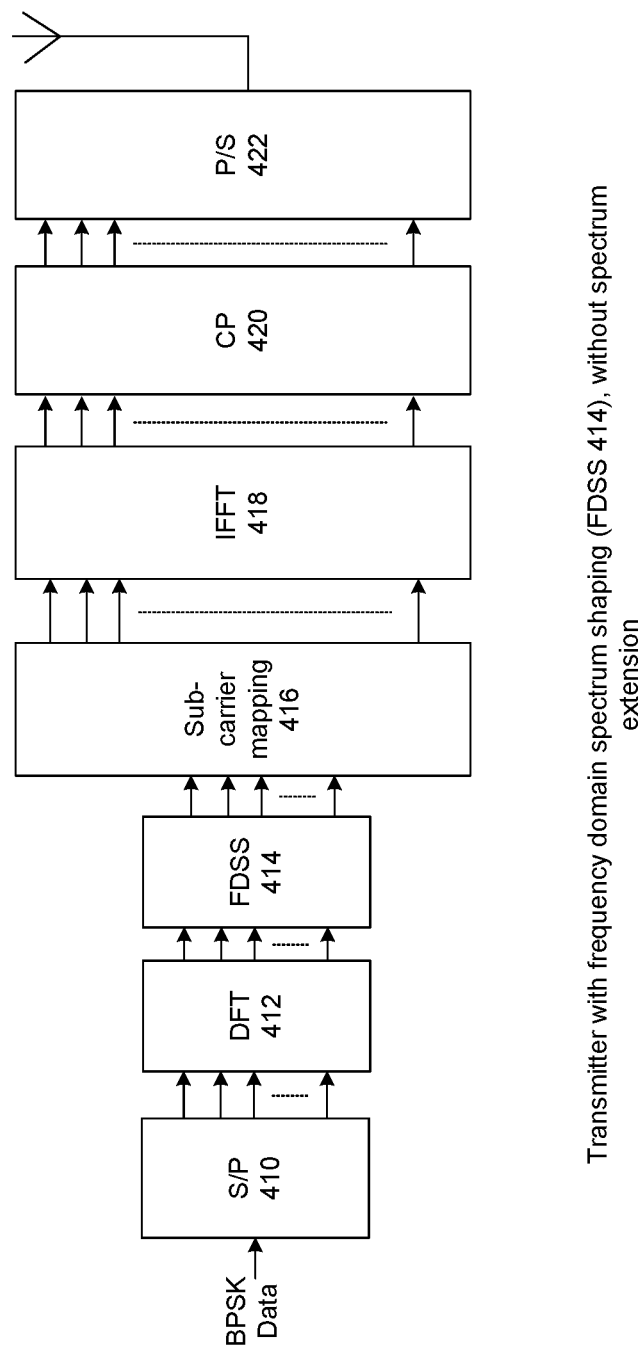
FIG. 4 is a block diagram of a transmitter with frequency domain spectrum shaping without spectrum extension according to an example embodiment.

FIG. 4 is a block diagram of a transmitter with frequency domain spectrum shaping without spectrum extension according to an example embodiment. The transmitter of FIG. 4 may be used to transmit data and/or reference signals, with spectrum shaping, and without spectrum extension. Data (e.g., bi-phase shift keying, or BPSK data, that may have been phase rotated by Pi/2) may be input to a serial-to-parallel converter 410, where serial data stream is converted to parallel output. A Discrete Fourier Transform (DFT) block 412 performs a discrete Fourier transform on the parallel data to output frequency domain values. A frequency domain spectrum shaper 414 (implemented herein the frequency domain), performs frequency domain spectrum shaping on the frequency domain values, e.g., to reduce PAPR. Spectrum shaped outputs from the FDSS 414 are input to a subcarrier mapping block 416, where spectrum shaped outputs are mapped to subcarriers of a signal to be transmitted (still in the frequency domain). At Inverse Fast Fourier Transform (IFFT) block 418, the outputs of block 416 are converted to time domain values via a IFFT process. A cyclic prefix (CP) is added to the time domain signal at cyclic prefix (CP) block 420. The signal output from block 420 is then converted from parallel to serial format via parallel-to-serial (P/S) block 422, and then is transmitted via an antenna.

Figure 5:
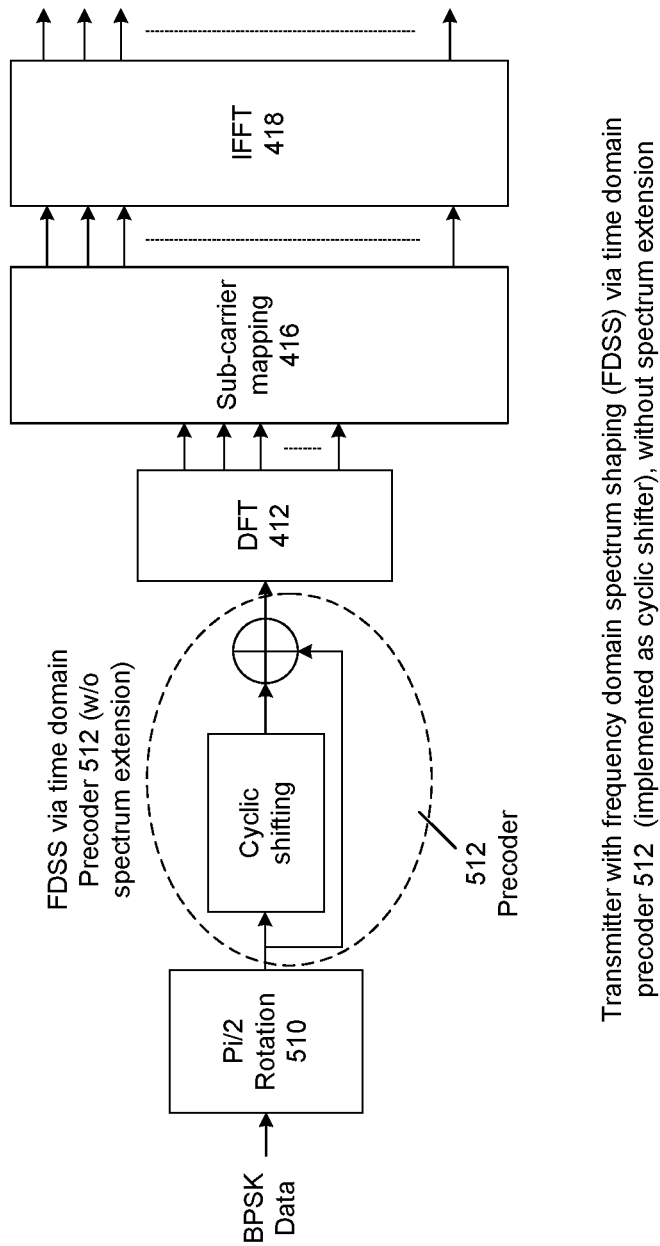
FIG. 5 is a block diagram of a transmitter with time domain spectrum shaping without spectrum extension according to an example embodiment.

FIG. 5 is a block diagram of a transmitter with time domain spectrum shaping without spectrum extension according to an example embodiment. The transmitter of FIG. 5 may be used to transmit data and/or reference signals, with spectrum shaping, and without spectrum extension. Data (e.g., BPSK data), may be input and rotated by a phase of Pi/2 by rotation block 510. A precoder (time domain precoder, implemented as a cyclic shifter) performs frequency domain spectrum shaping (in the time domain) on the received signal. The example shown in FIG. 5 covers two tap filter (1+D). Thus, spectrum shaping may be performed in either the frequency domain (e.g., via FDSS 414, FIG. 4), or performed in the time domain (e.g., via precoder 512, FIG. 5). As noted, for example, spectrum shaping may include the use of a filter to adjust the amplitude of one or more subcarriers or spectral components of a signal, e.g., in order to reduce PAPR for a transmitted signal or obtain other desired benefit. Some spectral shaping filters may provide a rounding function in which subcarriers or spectral components, e.g., near an edge of a channel or portion of bandwidth may be decreased or rounded-off, in order to reduce PAPR of the transmitted signal and/or in order to adjust the out-band emissions of the transmitted signal. Some example filters that may be used to provide spectrum shaping may include, e.g., a time domain precoding or time domain filter, including at least one of a (1+D) or a (x 1 x) filter; a frequency domain filter; a raised cosine (RC) filter; a root raised cosine (RRC) filter; and/or a truncated filter, as some examples. Other spectrum shaping functions or filters may be used. Spectrum shaping may be performed either without spectrum extension, or with a spectrum extension. The outputs of the precoder 512 may be input to and processed by DFT block 412, subcarrier mapping block 416, IFFT block 418, CP block 420 (not shown in FIG. 5), and P/S block 422 (not shown in FIG. 5), and then transmitted, for example.

Figure 6:
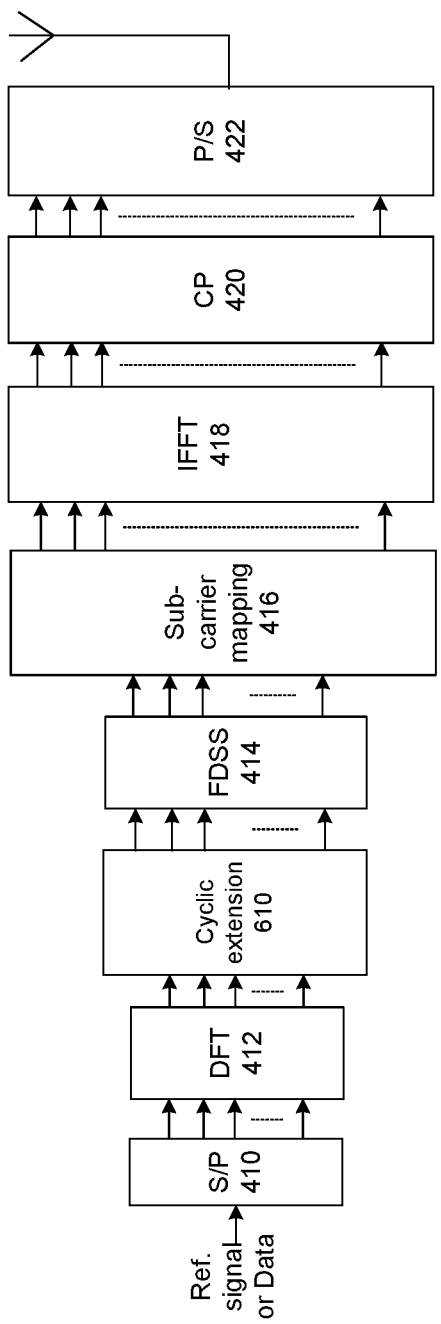
FIG. 6 is a block diagram of a transmitter with frequency domain spectrum shaping with spectrum extension according to an example embodiment.

FIG. 6 is a block diagram of a transmitter with frequency domain spectrum shaping with spectrum extension according to an example embodiment. In the example of FIG. 6, spectrum extension is provided via cyclic extension 610. The transmitter of FIG. 6 may be used to transmit a reference signal (e.g., DMRS or SRS) or data, with spectrum shaping and spectrum extension provided. Data (e.g., bi-phase shift keying, or BPSK data, that may have been phase rotated by Pi/2), or a reference signal (e.g., DMRS or SRS signal) may be input to a serial-to-parallel converter 410, where serial data stream is converted to parallel output. A Discrete Fourier Transform (DFT) block 412 performs a discrete Fourier transform on the parallel data to output frequency domain values. It should be noted that when transmitting reference signals, DFT block 412 may not be used at all (in these cases, DMRS sequences are characterized in the frequency domain).

As shown, the transmitter of FIG. 6, cyclic extension block 610 performs a cyclic extension on the frequency domain values output by the DFT block 412, in order to perform spectrum extension. As noted, spectrum extension may also be performed to further reduce PAPR of a signal. Spectrum extension may extend or increase the spectrum or range of frequencies of a signal, and thereby reduce PAPR of the signal. For example, a cyclic extension (performed by cyclic extension block 610 on the received signal) in the frequency domain may be used to perform spectrum extension in the frequency domain for a signal. A cyclic extension may involve copying a portion of outputs (such as frequency domain values output by a DFT block, or output by a previous block) at the end of outputs and appends those frequency domain values to the beginning of the outputs, which results in adding additional frequency domain values or excess (or additional) frequency bands. As noted, for transmission of DMRS signals, a DFT block 412 may not be used. Thus, spectrum extension may add, to the spectrum shaped signal, one or more subcarriers that are out-of-band or excess bands, on subcarriers that are outside of the PRB allocated to the UE/user device, and may be within an adjacent PRB that is allocated to another UE. As shown by FIG. 6, the transmitter of FIG. 6 may perform further processing, performed by blocks 416, 418, 420, and 422, as described with respect to transmitter of FIG. 4.

There may be a situation where neither spectrum shaping nor spectrum extension is performed at the transmitter. In such a case, there may be some changes in operations at the transmitter. For example, with respect to the transmitters shown in one or more of FIGS. 4-6, for a case where neither spectrum shaping nor spectrum extension is performed: for example, there may be no FDSS block (414)/related processing (e.g., frequency domain filter) at the transmitter between DFT and IFFT blocks; and/or, there may be no precoder processing (e.g., time domain filter, or precoder 512) at the transmitter, before the DFT bloc 412. Also, there may be no cyclic extension block 610 in FIG. 6 (since the cyclic extension 610 provides spectrum spreading).

Figure 7:
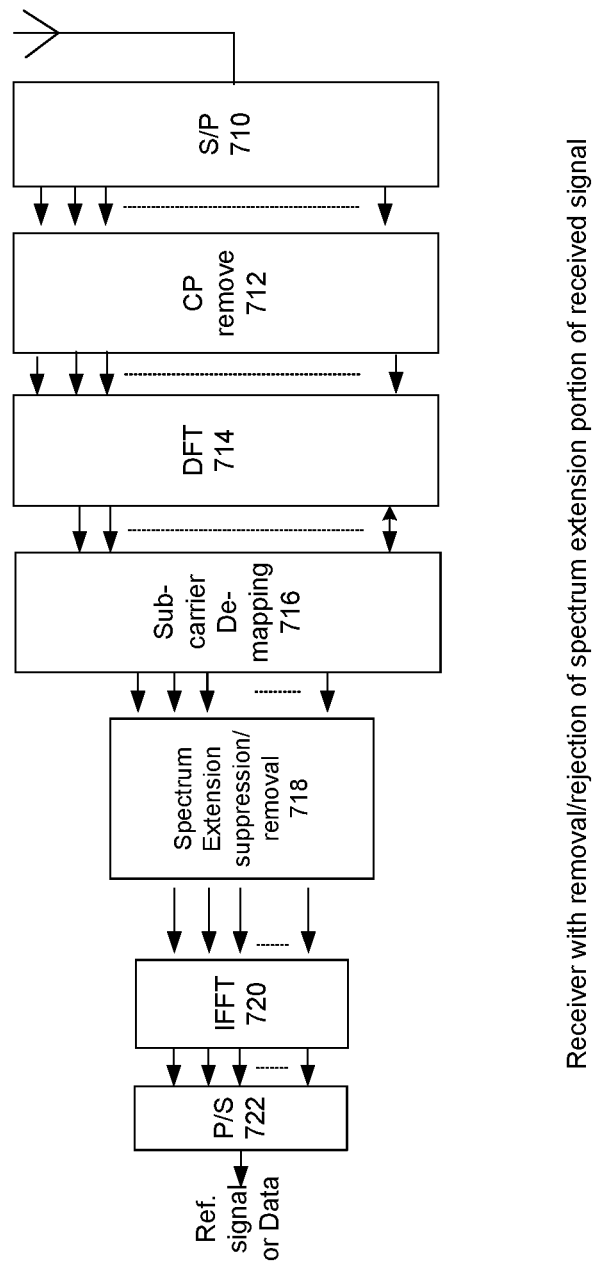
FIG. 7 is a block diagram of a receiver according to an example embodiment.

FIG. 7 is a block diagram of a receiver according to an example embodiment. A signal is input to a serial-to-parallel converter (S/P) 710, which converts serial input to a parallel format. A CP removal block 712 removes a cyclic prefix that may have been provided for the transmitted signal. A DFT (or FFT) block 714 performs a discrete (or Fast) Fourier transform to convert the received time domain signal to a frequency domain signal. Subcarrier de-mapping block 716 de-maps the frequency domain signal to generate frequency domain values. In the case where a spectrum extension was performed for the transmitted signal by the transmitter/UE, a spectrum extension suppression/removal block 718 may suppress, reject or otherwise remove the spectrum extension in the frequency domain from the frequency domain values. For example, block 718 may reject (e.g., via use of a filter or other processing) the subcarriers that are beyond or outside of the PRB allocated to the UE from which the reference signal was received. In an embodiment, receiver applies advanced receiver to mitigate interference created for the excess band. This approach may be used, e.g., when the entire orthogonal DMRS space (e.g., both IFDM combs) is used for UEs allocated to adjacent PRBs. Thus, for example, block 718 may, at least in part, reject or suppress frequency domain values for excess band subcarriers (e.g., subcarriers that are outside of the PRB allocated to the UE, such as one or more subcarriers of an adjacent PRB allocated to a different UE). IFFT (or an Inverse DFT (IDFT)) block 720 may perform an inverse FFT to convert the frequency domain values to time domain values (data or reference signal), which are then converted by P/S block 722 from parallel format to a serial format (convert to a serial sequence of time domain values), for further processing. IFFT/IDFT 720 block may not be needed when receiving reference signals.

Figure 8:
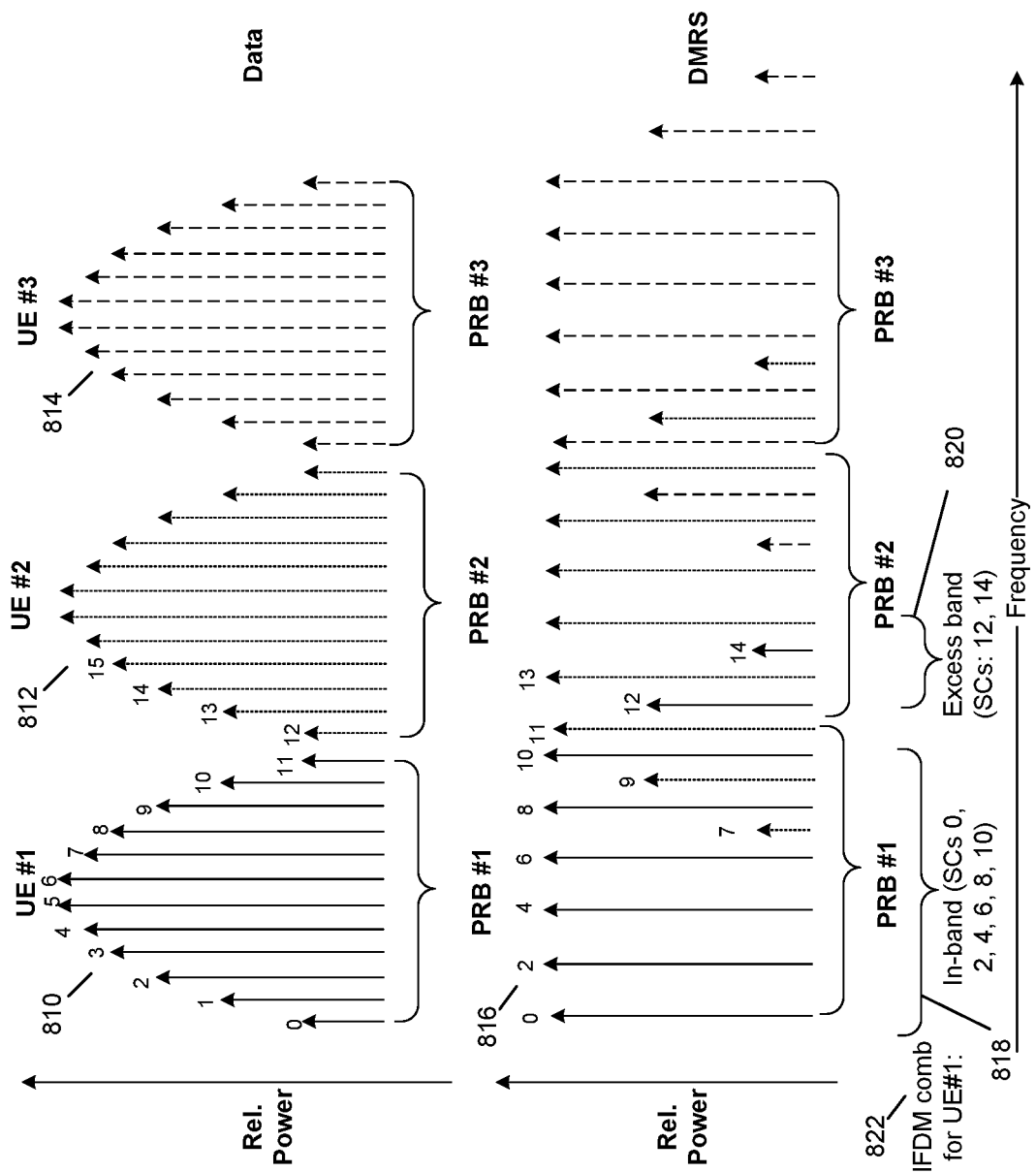
FIG. 8 is a diagram illustrating frequency domain spectrum shaping and spectrum extension according to an example embodiment.

FIG. 8 is a diagram illustrating frequency domain spectrum shaping and spectrum extension according to an example embodiment. A physical resource block (PRB) is shown for each of three UEs, including a PRB #1 allocated to UE #1, a PRB #2 allocated for UE #2, and a PRB #3 allocated to UE #3. Each PRB may include 12 subcarriers in this example. Each UE may transmit data via an allocated PRB, and also transmit a DMRS via the allocated PRB (via time-division-multiplexing). As shown in FIG. 8, UE #1 transmits data 810 via PRB #1, including via subcarriers 0-11 of the PRB #1. As shown, spectrum shaping may be performed on the data signal prior to transmission, e.g., where in this illustrative example, an amplitude or power of one or more subcarriers near an edge of the allocated PRB may be decreased or less, e.g., such as for subcarriers 0-3, and 8-11 (e.g., where subcarriers 0, 1, 10, 11 may have a lower or lowest power or amplitude for the data, and subcarriers 5, 6 may have a higher amplitude or power), e.g., so as to reduce PAPR for the transmitted data signal. Thus, in this example, the UE #1 transmits data via PRB #1 with frequency domain spectrum shaping (FDSS), and without spectrum extension. Similarly, UE #2 transmits data 812 via PRB #2, and UE #3 transmits data 814 via PRB #3 (e.g., both with frequency domain spectrum shaping, and without spectrum extension).

In the example shown in FIG. 8, each of the UEs transmit a DMRS using (or with) both spectrum shaping and a spectrum extension, in order to reduce PAPR for the reference signal (e.g., DMRS signal). In other words, each UE performs spectrum shaping and spectrum extension for the DMRS signal, and then may transmit the spectrum shaped and extended DMRS signal. Each UE transmits a separate DMRS signal via a different (or orthogonal) set of frequency resources. In the case of single-user MIMO, the UE may transmit more than one orthogonal DMRS at a time. These may be provided, e.g., by means (or use) of orthogonal cover codes among multiple DMRS symbols, and/or by means (or use) of orthogonal cyclic shifts within the IFDM comb. Each UE may transmit a spectrum shaped and spectrum extended DMRS signal via a different (or orthogonal) set of subcarriers, including a subset of in-band subcarriers within the PRB allocated (or assigned) to the UE, and one or more excess band subcarriers that are outside the PRB allocated to the UE and are within a PRB allocated to another UE. The number of excess band subcarriers used may depend on the applied roll-off. The excess band may be present in both sides of the allocated spectrum.

For example, at 816, UE #1 may transmit a DMRS signal via both in-band (within PRB #1 allocated to the UE #1) subcarriers (818) 0, 2, 4, 6, 8 and 10, and via excess band (or out of band) subcarriers (820) 12 and 14 (where subcarriers 12 and 14 are not part of PRB #1, but rather are part of PRB #2 that is allocated to UE #2). For example, at 816 the UE #1 may transmit a spectrum shaped and spectrum DMRS signal via an interlaced frequency division multiplex (IFDM) comb 822 using every nth (e.g., every $2^{nd}$, every $3^{rd}$, every $4^{th}$ . . . ) subcarrier within the in-band subcarriers 818 of PRB #1 (that is allocated to the UE #1), and one or more subcarriers of every $n^{th}$ subcarrier within the excess band subcarriers 820 of PRB #2 allocated to a different UE (to UE #2 in this case), where PRB #1 (allocated or assigned to UE #1) is adjacent to PRB #2 (allocated or assigned to UE #2). The IFDM comb includes a subset of subcarriers that is orthogonal to (different from) the subset of subcarrier that may be used by the adjacent UE (UE #2) to transmit its DMRS signal. In this example, for DMRS transmission, UE #1 is allocated or assigned every $2^{nd}$ subcarrier within its PRB #1 (in-band subcarriers 0, 2, 4, 6, 8, 10), and is assigned two (excess band subcarriers 12 and 14) of the first four subcarriers in the adjacent PRB #2 that is assigned to UE #2. The subcarriers (12, 14) in the excess band 820 are needed for DMRS signal transmission due to the spectrum extension performed for the DMRS signal, which extends or expands the spectrum or range of frequencies/subcarriers beyond the in-band subcarriers of the PRB #1 assigned or allocated to UE #1. At a receiver (e.g., at the network node or BS/gNB), such as the example receiver shown in FIG. 7, a filter or other device (e.g., spectrum extension suppression/removal block 718, FIG. 7) may be used to suppress, filter or reject at least the spectrum extension such as the excess band (820) subcarriers (e.g., subcarriers 12, 14, with respect to receiving the DMRS signal from UE #1) that were added by UE #1 for spectrum extension to further reduce PAPR.

At 810, the UE #1 may transmit a spectrum shaped block of data via only the set of frequency resources (subcarriers 0-11 of PRB #1) assigned to the UE #1, and not extending into or using frequency resources that are outside of or beyond the set of frequency resources assigned to the user device (e.g., spectrum shaped data from UE #1 does not use one or more subcarriers of adjacent PRBs, such as from PRB #2 that is assigned to UE #2 and is outside of PRB #1), e.g., because the spectrum shaped data is not spectrum extended, and thus, does not need to use subcarriers that are outside of the PRB #1 subcarriers assigned/allocated to UE #1.

Although the examples have been given by the scenario where a UE is transmitting, and a gNB/network node is receiving (i.e., for UL scenario), the principle is equally valid for the DL scenario where the gNB/network node is transmitting, and UE is receiving.

Example 1. A method comprising: receiving, by a user device from a network node, information indicating a set of frequency resources assigned to the user device for uplink transmission and a spectrum shaping configuration indicating at least spectrum shaping with spectrum extension for transmission of reference signals via the set of frequency resources; performing, by the user device, spectrum shaping with spectrum extension for a reference signal; and transmitting the spectrum shaped and extended reference signal via at least a portion of the set of frequency resources.

Example 2. The method of example 1: wherein the receiving information comprises receiving, by the user device from the network node, information indicating at least the set of frequency resources for uplink transmission and the spectrum shaping configuration that indicates spectrum shaping without spectrum extension for data transmission and spectrum shaping with spectrum extension for reference signal transmission; the method further comprising: performing, by the user device, spectrum shaping without spectrum extension for a block of data; wherein the transmitting further comprises transmitting, by the user device, the spectrum shaped block of data via at least a portion of the set of frequency resources.

Example 3. The method of example 2, wherein the receiving information comprises: receiving, by the user device from the network node, an uplink scheduling grant indicating at least the set of frequency resources for uplink transmission and the spectrum shaping configuration that indicates spectrum shaping without spectrum extension for data transmission and spectrum shaping with spectrum extension for reference signal transmission.

Example 4. The method of any of examples 2-3, wherein the performing spectrum shaping without spectrum extension for the block of data is performed based on at least one of the following: a time domain precoding or time domain filter, including at least one of a (1+D) or a (x 1 x) filter; a frequency domain filter; a raised cosine (RC) filter; a root raised cosine (RRC) filter; a truncated filter; or a filter adapted according to a frequency location on a carrier or a location within a frequency band or a location within a bandwidth part of the set of frequency resources assigned to the user device for uplink transmission.

Example 5. The method of any of examples 1-4, wherein the performing spectrum shaping with spectrum extension for the reference signal is performed based on at least one of the following: a frequency domain filter; a filter having a predefined roll-off; a raised cosine (RC) filter; a root raised cosine (RRC) filter; a truncated filter; or a filter adapted according to a frequency location on a carrier or a location within a frequency band or a location within a bandwidth part of the set of frequency resources assigned to the user device for uplink transmission.

Example 6. The method of any of examples 1-5, comprising: determining, based on the received spectrum shaping configuration, one or more parameters of a filter used by the user device to perform spectrum shaping.

Example 7. The method of any of examples 1-6, wherein the reference signal comprises at least one of: demodulation reference signals (DMRS); or sounding reference signals (SRS).

Example 8. The method of any of examples 1-7, wherein the performing spectrum shaping with spectrum extension comprises performing at least: performing a spectrum extension for the reference signal to cause one or more frequency domain values associated with the reference signal to extend to one or more frequency resources that are beyond the set of frequency resources assigned to the user device.

Example 9. The method of any of examples 1-8, wherein the transmitting the spectrum shaped and extended reference signal comprises: transmitting the spectrum shaped and extended reference signal via a combination of both a subset of subcarriers within the set of frequency resources assigned to the user device, and one or more subcarriers that are beyond the set of frequency resources assigned to the user device.

Example 10. The method of any of examples 1-9 wherein the user device comprises a first user device, and wherein the set of frequency resources comprises a first set of frequency resources assigned to the first user device, and wherein the transmitting the spectrum shaped and extended reference signal comprises: transmitting, by the first user device, the spectrum shaped and extended reference signal via an interlaced frequency division multiplex (IFDM) comb using every nth subcarrier within the first set of frequency resources assigned to the first user device and one or more subcarriers of every nth subcarrier within a second set of frequency resources, wherein n is an integer greater than 1, wherein the second set of frequency resources is assigned to a second user device and is adjacent to the first set of frequency resources.

Example 11. The method of example 2, wherein the transmitting, by the user device, the spectrum shaped block of data via at least a portion of the set of frequency resources comprises: transmitting the spectrum shaped data via only the set of frequency resources assigned to the user device, and not extending into or using frequency resources that are outside of or beyond the set of frequency resources assigned to the user device.

Example 12. The method of example 1, wherein the receiving comprises receiving information indicating a set of time-frequency resources including a set of subcarriers of a physical resource block (PRB) assigned to the user device for uplink transmission for a plurality of symbols, wherein the user device uses time division multiplexing to transmit the data block and the reference signal via the set of subcarriers of the PRB assigned to the user device within at least a portion of the plurality of symbols.

Example 13. The method of any of examples 1-12, wherein performing spectrum shaping with spectrum extension for a reference signal comprises at least: performing, by the user device, a spectrum extension for the reference signal via a cyclic extension in frequency domain for the reference signal.

Example 14. An apparatus comprising means for performing the method of any of examples 1-13.

Example 15. A computer program comprising instructions which, when the program is executed by a computer, cause the computer to carry out the method of any of examples 1-13.

Example 16. An apparatus comprising: at least one processor; and at least one memory including computer program code; the at least one memory and the computer program code configured to, with the at least one processor, cause the apparatus at least to perform the method of any of examples 1-13.

Example 17. A method comprising: transmitting, by a network node to a user device, information indicating a set of frequency resources assigned to the user device for uplink transmission and a spectrum shaping configuration indicating at least spectrum shaping with spectrum extension for transmission of reference signals via the set of frequency resources; and receiving, by the network node from the user device based on the sending, a spectrum shaped and extended reference signal via at least a portion of the set of frequency resources assigned to the user device.

Example 18. The method of example 17: wherein the transmitting information comprises sending, by the network node to the user device, information indicating at least the set of frequency resources for uplink transmission and the spectrum shaping configuration that indicates spectrum shaping without spectrum extension for data transmission and spectrum shaping with spectrum extension for reference signal transmission; wherein the receiving further comprises receiving, by the network node from the user device, a spectrum shaped block of data via at least a portion of the set of frequency resources.

Example 19. The method of example 18, wherein the transmitting information comprises: transmitting, by the network node to the user device, an uplink scheduling grant indicating at least the set of frequency resources for uplink transmission and the spectrum shaping configuration that indicates spectrum shaping without spectrum extension for data transmission and spectrum shaping with spectrum extension for reference signal transmission.

Example 20. The method of any of examples 17-19, wherein the reference signal comprises at least one of: demodulation reference signals (DMRS); or sounding reference signals (SRS).

Example 21. The method of any of examples 17-20, wherein the receiving the spectrum shaped and extended reference signal comprises: receiving the spectrum shaped and extended reference signal via a combination of both a subset of subcarriers within the set of frequency resources assigned to the user device, and one or more subcarriers that are beyond or outside of the set of frequency resources assigned to the user device.

Example 22. The method of any of examples 17-21 wherein the user device comprises a first user device, and wherein the set of frequency resources comprises a first set of frequency resources assigned to the first user device, and wherein the receiving the spectrum shaped and extended reference signal comprises: receiving, by the network node from the first user device, the spectrum shaped and extended reference signal via an interlaced frequency division multiplex (IFDM) comb using every nth subcarrier within the first set of frequency resources assigned to the first user device and one or more subcarriers of every nth subcarrier within a second set of frequency resources, wherein n is an integer greater than 1, wherein the second set of frequency resources is assigned to a second user device and is adjacent to the first set of frequency resources.

Example 23. The method of example 18, wherein the receiving, by the network node, the spectrum shaped block of data via at least a portion of the set of frequency resources comprises: receiving, by the network node from the user device, the spectrum shaped data via only the set of frequency resources assigned to the user device, and not extending into or using frequency resources that are outside of or beyond the set of frequency resources assigned to the user device.

Example 24. The method of any of examples 17-23, wherein the user device comprises a first user device, wherein the transmitting information comprises: transmitting, by the network node to the first user device, information indicating a first set of frequency resources assigned to the first user device for uplink transmission and a spectrum shaping configuration indicating at least spectrum shaping with spectrum extension for transmission of reference signals via the first set of frequency resources; the method further comprising: transmitting, by the network node to a second user device, information indicating a second set of frequency resources assigned to the second user device for uplink transmission and a spectrum shaping configuration indicating at least spectrum shaping with spectrum extension for transmission of reference signals via the second set of frequency resources; and wherein the first set of frequency resources is orthogonal to the second set of frequency resources, such that a spectrum shaped and extended reference signal transmission from the first user device remains orthogonal or does not interfere with a spectrum shaped and extended reference signal transmission from the second user device.

Example 25. The method of any of examples 17-24, wherein the user device comprises a first user device, wherein the transmitting information comprises: transmitting, by the network node to the first user device, information indicating a first interlaced frequency division multiplex (IFDM) comb of subcarriers, including a subset of in-band subcarriers within a first physical resource block (PRB) allocated to the first user device and a subset of out-of-band subcarriers outside of the first PRB allocated to the first user device; the method further comprising: transmitting, by the network node to a second user device, information indicating a second interlaced frequency division multiplex (IFDM) comb of subcarriers, including a subset of in-band subcarriers within a second physical resource block (PRB) allocated to the second user device and a subset of out-of-band subcarriers outside of the second PRB allocated to the second user device; wherein the first PRB allocated to the first user device is adjacent to the second PRB allocated to the second user device; wherein the first IFDM comb of subcarriers is orthogonal to the second IFDM comb of subcarriers to allow the first user device and the second user device to transmit spectrum extended reference signals via the first IFDM comb of subcarriers and the second IFDM comb of subcarriers, respectively.

Example 26. The method of any of examples 17-25, wherein the user device comprises a first user device, wherein the transmitting information comprises: transmitting, by the network node to the first user device, information indicating a first interlaced frequency division multiplex (IFDM) comb of subcarriers, including a subset of in-band subcarriers within a first physical resource block (PRB) allocated to the first user device and a subset of out-of-band subcarriers outside of the first PRB allocated to the first user device; the method further comprising: transmitting, by the network node to a second user device, information indicating a second interlaced frequency division multiplex (IFDM) comb of subcarriers, including a subset of in-band subcarriers within a second physical resource block (PRB) allocated to the second user device and a subset of out-of-band subcarriers outside of the second PRB allocated to the second user device; wherein the receiving comprises: receiving, by the network node from the first user device via at least the first IDFM comb of subcarriers, a spectrum shaped and extended reference signal, while suppressing reference signal interference caused by the spectrum extension of a reference signal transmitted by the second user device resulting from the spectrum extension. present on a subset of the out-of-band subcarriers outside of the second PRB that overlaps the first PRB allocated to the first user device.

Example 27. An apparatus comprising means for performing the method of any of examples 17-26.

Example 28. A computer program comprising instructions which, when the program is executed by a computer, cause the computer to carry out the method of any of examples 17-26.

Example 29. An apparatus comprising: at least one processor; and at least one memory including computer program code; the at least one memory and the computer program code configured to, with the at least one processor, cause the apparatus at least to perform the method of any of examples 17-26.

Figure 9:
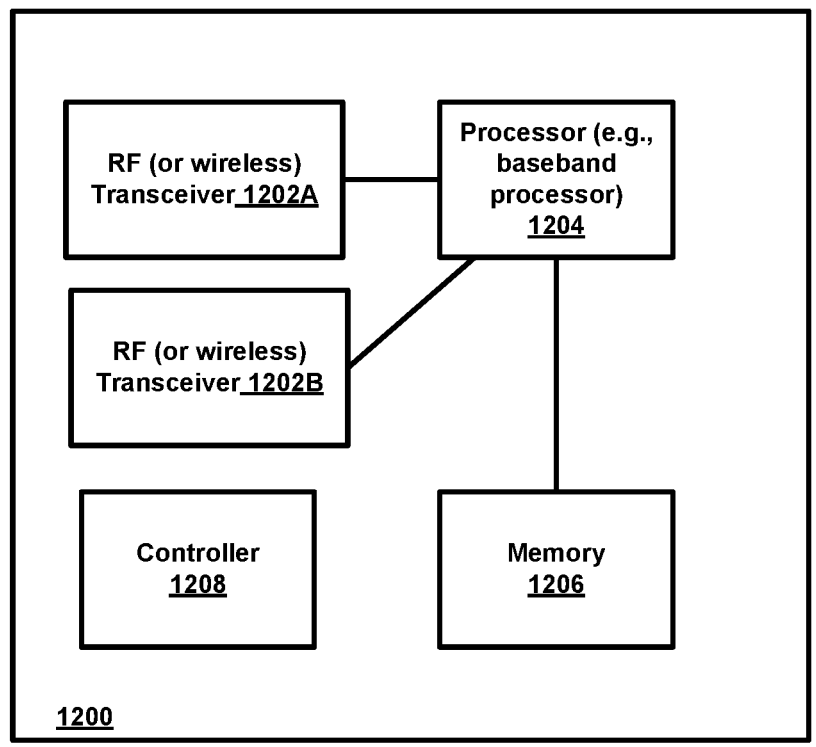
FIG. 9 is a block diagram of a wireless station, network node or wireless node (e.g., AP, BS, RAN node, UE or user device, or other wireless node or network node) according to an example embodiment.

FIG. 9 is a block diagram of a wireless station (e.g., AP, BS or user device/UE, or another network node) 1200 according to an example embodiment. The wireless station 1200 may include, for example, one or more (e.g., two as shown) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein.

Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 9, a controller (or processor) 1208 may execute software and instructions, and may provide overall control for the station 1200, and may provide control for other systems not shown in FIG. 9, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, with a user device from a network node, information indicating a set of frequency resources assigned to the user device for uplink transmission and a spectrum shaping configuration indicating at least spectrum shaping with spectrum extension for transmission of reference signals via the set of frequency resources, wherein receiving the information further comprises:
      receiving, with the user device from the network node, information indicating at least the set of frequency resources for uplink transmission and the spectrum shaping configuration that indicates spectrum shaping without spectrum extension for data transmission and spectrum shaping with spectrum extension for reference signal transmission; and
   receiving, with the user device from the network node, an uplink scheduling grant indicating at least the set of frequency resources for uplink transmission and the spectrum shaping configuration that indicates spectrum shaping without spectrum extension for data transmission and spectrum shaping with spectrum extension for reference signal transmission;
   performing, with the user device, spectrum shaping with spectrum extension for a reference signal based on the following: a frequency domain filter; a filter having a predefined roll-off; a raised cosine (RC) filter; a root raised cosine (RRC) filter; a truncated filter; and a filter adapted according to a frequency location on a carrier or a location within a frequency band or a location within a bandwidth part of the set of frequency resources assigned to the user device for uplink transmission, and wherein performing the spectrum shaping with spectrum extension comprises:
      performing a spectrum extension for the reference signal to cause one or more frequency domain values associated with the reference signal to extend to one or more frequency resources that are beyond the set of frequency resources assigned to the user device;
   performing, with the user device, spectrum shaping without spectrum extension for a block of data based on the following: a time domain precoding and a time domain filter, a (1+D) or a (x 1 x) filter; the frequency domain filter; the RC filter; the RRC filter; the truncated filter; and the filter adapted according to the frequency location on the carrier or the location within the frequency band or the location within the bandwidth part of the set of frequency resources assigned to the user device for uplink transmission; and
   transmitting the spectrum shaped and extended reference signal via an interlaced frequency division multiplex (IFDM) comb using every $n^{th}$ subcarrier within a first set of frequency resources assigned to the user device and one or more subcarriers of every $n^{th}$ subcarrier within a second set of frequency resources, wherein n is an integer greater than 1, wherein the second set of frequency resources is assigned to a second user device and is adjacent to the first set of frequency resources.

2. The method of claim 1, further comprising: determining, based on the received spectrum shaping configuration, one or more parameters of a filter used with the user device to perform spectrum shaping.

3. An apparatus comprising: at least one processor; and at least one non-transitory memory storing instructions that, when executed with the at least one processor, cause the apparatus to perform the method of claim 1.

4. The method of claim 2, wherein the reference signal comprises: demodulation reference signals (DMRS); and sounding reference signals (SRS).

5. An apparatus comprising:
   a processor; and
   a memory comprising computer-executable instructions that, when executed by the processor, cause the apparatus to perform the following operations:
      receiving, from a network node, information indicating a set of frequency resources assigned to the apparatus for uplink transmission and a spectrum shaping configuration indicating at least spectrum shaping with spectrum extension for transmission of reference signals via the set of frequency resources, wherein receiving the information further comprises:
receiving, from the network node, information indicating at least the set of frequency resources for uplink transmission and the spectrum shaping configuration that indicates spectrum shaping without spectrum extension for data transmission and spectrum shaping with spectrum extension for reference signal transmission; and
receiving, from the network node, an uplink scheduling grant indicating at least the set of frequency resources for uplink transmission and the spectrum shaping configuration that indicates spectrum shaping without spectrum extension for data transmission and spectrum shaping with spectrum extension for reference signal transmission;
performing spectrum shaping with spectrum extension for a reference signal based on the following: a frequency domain filter; a filter having a predefined roll-off; a raised cosine (RC) filter; a root raised cosine (RRC) filter; a truncated filter; and a filter adapted according to a frequency location on a carrier or a location within a frequency band or a location within a bandwidth part of the set of frequency resources assigned to the user device for uplink transmission, and wherein performing the spectrum shaping with spectrum extension comprises:
performing a spectrum extension for the reference signal to cause one or more frequency domain values associated with the reference signal to extend to one or more frequency resources that are beyond the set of frequency resources assigned to the user device;
performing spectrum shaping without spectrum extension for a block of data based on the following: a time domain precoding and a time domain filter, a (1+D) or a (x 1 x) filter;
the frequency domain filter; the RC filter; the RRC filter; the truncated filter; and the filter adapted according to the frequency location on the carrier or the location within the frequency band or the location within the bandwidth part of the set of frequency resources assigned to the user device for uplink transmission; and
transmitting the spectrum shaped and extended reference signal via an interlaced frequency division multiplex (IFDM) comb using every $n^{th}$ subcarrier within a first set of frequency resources assigned to the apparatus and one or more subcarriers of every $n^{th}$ subcarrier within a second set of frequency resources, wherein n is an integer greater than 1, wherein the second set of frequency resources is assigned to a second apparatus and is adjacent to the first set of frequency resources.

6. A system comprising:
an apparatus;
a processor; and
a memory comprising computer-executable instructions that, when executed by the processor, cause the apparatus to perform the following operations:
receiving, from a network node, information indicating a set of frequency resources assigned to the user device for uplink transmission and a spectrum shaping configuration indicating at least spectrum shaping with spectrum extension for transmission of reference signals via the set of frequency resources, wherein receiving the information further comprises:
receiving, from the network node, information indicating at least the set of frequency resources for uplink transmission and the spectrum shaping configuration that indicates spectrum shaping without spectrum extension for data transmission and spectrum shaping with spectrum extension for reference signal transmission; and
receiving, from the network node, an uplink scheduling grant indicating at least the set of frequency resources for uplink transmission and the spectrum shaping configuration that indicates spectrum shaping without spectrum extension for data transmission and spectrum shaping with spectrum extension for reference signal transmission;
performing spectrum shaping with spectrum extension for a reference signal based on the following: a frequency domain filter; a filter having a predefined roll-off; a raised cosine (RC) filter; a root raised cosine (RRC) filter; a truncated filter; and a filter adapted according to a frequency location on a carrier or a location within a frequency band or a location within a bandwidth part of the set of frequency resources assigned to the user device for uplink transmission, and wherein performing the spectrum shaping with spectrum extension comprises:
performing a spectrum extension for the reference signal to cause one or more frequency domain values associated with the reference signal to extend to one or more frequency resources that are beyond the set of frequency resources assigned to the user device;
performing spectrum shaping without spectrum extension for a block of data based on the following: a time domain precoding and a time domain filter, a (1+D) or a (x 1 x) filter; the frequency domain filter; the RC filter; the RRC filter; the truncated filter; and the filter adapted according to the frequency location on the carrier or the location within the frequency band or the location within the bandwidth part of the set of frequency resources assigned to the user device for uplink transmission; and
transmitting the spectrum shaped and extended reference signal via an interlaced frequency division multiplex (IFDM) comb using every $n^{th}$ subcarrier within a first set of frequency resources assigned to the apparatus and one or more subcarriers of every $n^{th}$ subcarrier within a second set of frequency resources, wherein n is an integer greater than 1, wherein the second set of frequency resources is assigned to a second apparatus and is adjacent to the first set of frequency resources.

* * * * *